US012622838B2

(12) United States Patent
Liu

(10) Patent No.: US 12,622,838 B2
(45) Date of Patent: May 12, 2026

(54) MASSAGE DEVICE

(71) Applicant: Qian Liu, Changde (CN)

(72) Inventor: Qian Liu, Changde (CN)

( * ) Notice: Subject to any disclaimer, the term of this patent is extended or adjusted under 35 U.S.C. 154(b) by 0 days.

(21) Appl. No.: 19/093,277

(22) Filed: Mar. 28, 2025

(65) Prior Publication Data

US 2025/0312229 A1 Oct. 9, 2025

(30) Foreign Application Priority Data

Apr. 3, 2024 (CN) ......................... 202420677174.0

(51) Int. Cl.
*A61H 19/00* (2006.01)
*A61H 7/00* (2006.01)

(52) U.S. Cl.
CPC ....... *A61H 7/00* (2013.01); *A61H 2201/0192* (2013.01); *A61H 2201/1215* (2013.01); *A61H 2201/14* (2013.01); *A61H 2201/149* (2013.01); *A61H 2201/1669* (2013.01)

(58) Field of Classification Search
CPC ......... A61H 19/00; A61H 19/30; A61H 19/32
See application file for complete search history.

(56) References Cited

U.S. PATENT DOCUMENTS 11,317,961 B2 * 5/2022 Luzon .................... A61B 18/14
11,752,063 B1 * 9/2023 Huang ................... A61H 19/32
600/38
11,806,306 B1 * 11/2023 Guo ....................... A61H 7/007
12,161,598 B1 * 12/2024 Wang ................. A61H 23/0263
12,220,371 B2 * 2/2025 Sanna Pinto .......... A61H 19/50
2010/0036298 A1 * 2/2010 Fuster .................... A61H 7/008
601/134
2017/0007496 A1 * 1/2017 Cambridge ............ A61H 19/32
2021/0196556 A1 * 7/2021 Fuster .................... A61H 7/008
2023/0116215 A1 * 4/2023 Liu ...................... A61H 9/0057
600/38
2023/0210718 A1 * 7/2023 Zhou ...................... A61H 19/32
600/38
2023/0355466 A1 * 11/2023 Cheng ..................... A61F 7/007
2023/0381060 A1 * 11/2023 Wersland ............. A61H 23/006
2024/0252384 A1 * 8/2024 Zhou ...................... A61H 7/008
2025/0052303 A1 * 2/2025 Wu ........................ F16M 11/18
2025/0090412 A1 * 3/2025 Chen ...................... A61H 23/02
2025/0241819 A1 * 7/2025 Chen .................. A61B 10/0058

* cited by examiner

*Primary Examiner* — Justine R Yu
*Assistant Examiner* — Christopher E Miller
(74) *Attorney, Agent, or Firm* — Sandy Lipkin

(57) ABSTRACT

The massage device includes a housing, a massage portion, at least one swing arm and a driving device, where the massage portion is slidably arranged on the housing, and the massage portion includes a first pinching portion and a second pinching portion that are oppositely arranged and made of flexible materials, such that a massage cavity is provided between the first pinching portion and the second pinching portion. A first end of the at least one swing arm is arranged in at least one of the first pinching portion and the second pinching portion, and the driving device is used for driving the first pinching portion and the second pinching portion to move back and forth.

19 Claims, 14 Drawing Sheets

MASSAGE DEVICE

CROSS REFERENCE TO RELATED APPLICATIONS

The present disclosure claims the priority of Chinese Patent Application No. 202420677174.0 filed on Apr. 3, 2024. All the above are hereby incorporated by reference in their entirety.

TECHNICAL FIELD

The present disclosure relates to the technical field of body massage, and in particular to a massage device.

BACKGROUND

At present, a massage device generally massages, relaxes or stimulates a body through a mechanical action or electrical stimulation. When muscles are sore and tight due to fatigue, the massage device can be used for massaging the muscles to relax the muscles and activate collaterals, improve blood circulation, relax muscles of various regions tightened after exercise, and effectively reduce fatigue and soreness caused by the exercise or work. Mechanical massage devices are generally designed according to massage techniques of human hands, so as to realize the effect of manual massage.

However, the massage devices on the market generally only massage a massage region of body through an electric motor vibration mode or a sleeve telescopic sliding mode, massage actions are relatively simple, and functions are relatively common, such that a massage effect is poor, and user experience is poor.

SUMMARY

An objective of the present disclosure is to provide a massage device, which aims at solving the technical problems that massage actions are relatively simple and a massage effect is poor in the prior art.

To achieve the above objective, in a first aspect, the technical solution of the present disclosure provides a massage device, including:

housing;

a massage portion, where the massage portion is slidably arranged on the housing, and the massage portion includes a first pinching portion and a second pinching portion that are oppositely arranged and made of flexible materials, such that a massage cavity is provided between the first pinching portion and the second pinching portion;

a positioning portion used for supporting a massage region of body and arranged at a front end of the housing;

at least one swing arm, where a first end of the at least one swing arm is arranged in at least one of the first pinching portion and the second pinching portion; and a driving device, where the driving device is used for driving the first pinching portion and the second pinching portion to move back and forth in a direction facing the positioning portion, and simultaneously driving at least one of the first pinching portion and the second pinching portion to move in a direction approaching or being away from each other through the at least one swing arm.

Further, two sides of the first pinching portion and two sides of the second pinching portion are correspondingly connected to form a flexible sleeve, an interior of the flexible sleeve extends in a sliding direction of the flexible sleeve to form the massage cavity, and an end, facing the positioning portion, of the massage cavity is provided with an opening.

Further, the massage portion further comprises a seat body, the flexible sleeve is mounted on the seat body, and the seat body is slidably connected to the housing.

Further, the at least one swing arm is rotationally mounted on the massage portion, and a second end of the at least one swing arm is slidably and rotationally connected to the housing.

Further, the housing is provided with at least one guide groove, and the second end of the at least one swing arm is slidably and rotationally embedded in the at least one guide groove in a one-to-one corresponding manner.

Further, the at least one guide groove comprises a first guide groove and a second guide groove, a first included angle is formed between an extending direction of the first guide groove and an extending direction of the second guide groove, the at least one swing arm comprises a first swing arm and a second swing arm, a second end of the first swing arm is slidably and rotationally embedded in the first guide groove, and a second end of the second swing arm is slidably and rotationally embedded in the second guide groove, such that when the second end of the first swing arm slides along the first guide groove and the second end of the second swing arm slides along the second guide groove, a first end of the first swing arm and a first end of the second swing arm swing back and forth in a direction approaching or being away from each other.

Further, a first shaft end extends from the second end of the first swing arm in a direction parallel to an rotation axis of the first swing arm, the first shaft end is rotationally and slidably embedded in the first guide groove, a second shaft end extends from the second end of the second swing arm in a direction parallel to a rotation axis of the second swing arm, and the second shaft end is rotationally and slidably embedded in the second guide groove.

Further, the driving device comprises a telescopic driving mechanism, and the telescopic driving mechanism is in driving connection to the seat body, such that the telescopic driving mechanism drives the massage portion to move back and forth through the seat body.

Further, the driving device comprises a telescopic driving mechanism, and the telescopic driving mechanism comprises:

a driving motor arranged in the housing;

a rotating member being in driving connection the driving motor;

a push-pull member, wherein one end of the push-pull member is movably connected to the rotating member, and the other end of the push-pull member is connected to the massage portion, such that the rotating member is driven to rotate through the driving motor, and the massage portion is driven to move back and forth through the push-pull member; and a guide structure, wherein the guide structure is arranged between the massage portion and the housing, such that the massage portion is guided to move back and forth along a predetermined path through the guide structure.

Further, a rotation axis of the rotating member extends in a direction perpendicular to a sliding direction of the massage portion, a third shaft end extends in a direction parallel to the rotation axis of the rotating member at an eccentric position of the rotating member, a sliding groove is provided at one end of the push-pull member in a direction perpendicular to the sliding direction of the massage portion, and the third shaft end is movably embedded in the sliding groove.

Further, a hollow cavity is provided in the housing, the massage portion is slidably and at least partially arranged in the hollow cavity, a flexible waterproof ring is arranged between an outer periphery of the massage portion and an inner wall of the hollow cavity, and the flexible waterproof ring is arranged in a stretchable manner in a sliding direction of the massage portion.

Further, a hollow cavity is provided in the housing, the massage portion is slidably and at least partially arranged in the hollow cavity, a flexible waterproof ring is arranged between an outer periphery of the seat body and an inner wall of the hollow cavity, the flexible waterproof ring is arranged in a stretchable manner in a sliding direction of the massage portion, an annular groove is circumferentially provided in the seat body, an inner ring of the flexible waterproof ring is arranged in the annular groove in a sleeved manner, and an outer ring of the flexible waterproof ring is fixed on the inner wall of the hollow cavity through a pressing ring.

Further, the positioning portion is in an annular sleeve structure, such that an insertion opening is provided on the positioning portion, and the insertion opening is arranged corresponding to the massage cavity; or the positioning portion is provided with an arc-shaped supporting surface for supporting the massage region of body.

Further, the positioning portion is at least partially made of a silicone or rubber material.

In a second aspect, the technical solution of the present disclosure provides a massage device, including:

housing;

a massage portion, where the massage portion is slidably arranged on the housing, and the massage portion includes a first pinching portion and a second pinching portion that are oppositely arranged and made of flexible materials, such that a massage cavity is provided between the first pinching portion and the second pinching portion;

at least one swing arm, where a first end of the at least one swing arm is arranged in at least one of the first pinching portion and the second pinching portion; and a driving device, where the driving device is used for driving the first pinching portion and the second pinching portion to move back and forth, and simultaneously driving at least one of the first pinching portion and the second pinching portion to move in a direction approaching or being away from each other through the at least one swing arm.

The at least one swing arm is rotationally mounted on the massage portion, and a second end of the at least one swing arm is slidably and rotationally connected to the housing.

Further, two sides of the first pinching portion and two sides of the second pinching portion are correspondingly connected to form a flexible sleeve, an interior of the flexible sleeve extends in a sliding direction of the flexible sleeve to form the massage cavity, and one end of the massage cavity is provided with an opening.

Further, the massage portion further comprises a seat body, the flexible sleeve is mounted on the seat body, and the seat body is slidably connected to the housing.

Further, the housing is provided with at least one guide groove, and the second end of the at least one swing arm is slidably and rotationally embedded in the at least one guide groove in a one-to-one corresponding manner.

In a third aspect, the technical solution of the present disclosure provides a massage device, including:

housing;

a massage portion, where the massage portion is slidably arranged on the housing, and the massage portion includes a first pinching portion and a second pinching portion that are oppositely arranged and made of flexible materials, such that a massage cavity is provided between the first pinching portion and the second pinching portion;

at least one swing arm, where a first end of the at least one swing arm is arranged in at least one of the first pinching portion and the second pinching portion; and a driving device, where the driving device is used for driving the first pinching portion and the second pinching portion to move back and forth, and simultaneously driving at least one of the first pinching portion and the second pinching portion to move in a direction approaching or being away from each other through the at least one swing arm.

Further, the at least one swing arm is rotationally mounted on the massage portion, the housing is provided with at least one guide groove, and a second end of the at least one swing arm is slidably and rotationally embedded in the at least one guide groove in a one-to-one corresponding manner.

According to the above-mentioned technical solutions, the massage device of the present disclosure combines telescopic sliding of the massage portion and reciprocating swing of the swing arms, such that at least one of the first pinching portion and the second pinching portion is driven to move in the direction approaching or being away from each other through while the first pinching portion and the second pinching portion move back and forth, thereby increasing pinching massage between the first pinching portion and the second pinching portion on the basis of telescopic massage of the massage portion, diversifying massage actions or functions of the massage device, obviously improving a massage effect, and bringing good massage experience to users.

BRIEF DESCRIPTION OF THE DRAWINGS

In order to illustrate the technical solution in embodiments of the present disclosure more clearly, the following briefly introduces accompanying drawings used in the description of the embodiments. Obviously, the accompanying drawings in the following description are only some embodiments of the present disclosure. Those of ordinary skill in the art can obtain other accompanying drawings from these accompanying drawings without any creative efforts.

DETAILED DESCRIPTIONS OF THE EMBODIMENTS

Figure 1:
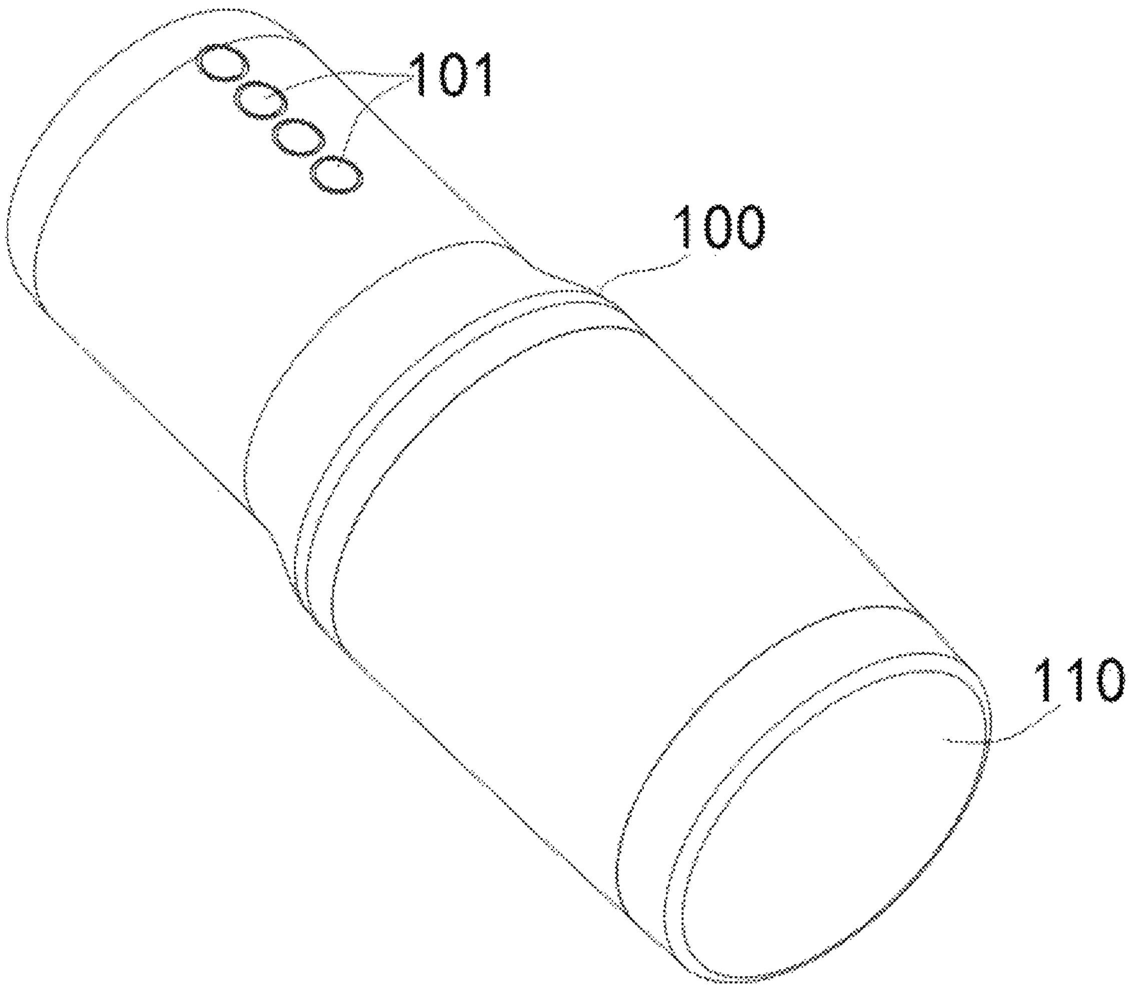
FIG. 1 is a perspective view of a massage device in an embodiment provided in an example of the present application.

Examples of the present application provide a massage device so as to solve the technical problems that massage actions are relatively simple and a massage effect is poor in the prior art. According to the massage device, telescopic motion of a massage portion 200 and reciprocating swing of a first swing arm 410 and a second swing arm 420 are combined, such that pinching massage between the first swing arm 410 and the second swing arm 420 is increased on the basis of telescopic massage of the massage portion 200, thereby enhancing a massage effect.

In order to make those skilled in the art better understand the technical solution of the present disclosure, the technical solution in the embodiments of the present disclosure will be clearly and completely described below with reference to accompanying drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without any creative efforts fall within the protection scope of the present disclosure.

Referring to FIGS. 1-14, this examples provides a massage device. The massage device includes a housing 100, a massage portion 200, a pinching massage assembly 400 and a driving device, where the massage portion 200 is slidably arranged on the housing 100, and the massage portion 200 includes a first pinching portion 230 and a second pinching portion 240 that are oppositely arranged and made of flexible materials, such that a massage cavity 211 is provided between the first pinching portion 230 and the second pinching portion 240. The pinching massage assembly 400 includes at least one swing arm, and a first end of the at least one swing arm is arranged in at least one of the first pinching portion 230 and the second pinching portion 240. The driving device is used for driving the first pinching portion 230 and the second pinching portion 240 to move back and forth, and simultaneously driving at least one of the first pinching portion 230 and the second pinching portion 240 to move in a direction approaching or being away from each other through the at least one swing arm, such that a massage region of body is stretched into the massage cavity between the first pinching portion 230 and the second pinching portion 240, and pinching massage between the first pinching portion 230 and the second pinching portion 240 is performed while telescopic sliding massage is performed on the massage region of body. This example has not specific limitation on the massage region of body, and the massage region of body may be a penis or a finger etc.

As shown in the figures, for the massage device in this example, telescopic sliding of the massage portion 200 and reciprocating swing of the swing arms are combined, such that at least one of the first pinching portion 230 and the second pinching portion 240 is driven to move in the direction approaching or being away from each other through while the first pinching portion 230 and the second pinching portion 240 move back and forth, thereby increasing pinching massage between the first pinching portion 230 and the second pinching portion 240 on the basis of telescopic massage of the massage portion 200, diversifying massage actions or functions of the massage device, obviously improving a massage effect, and bringing good massage experience to users.

Figure 12:
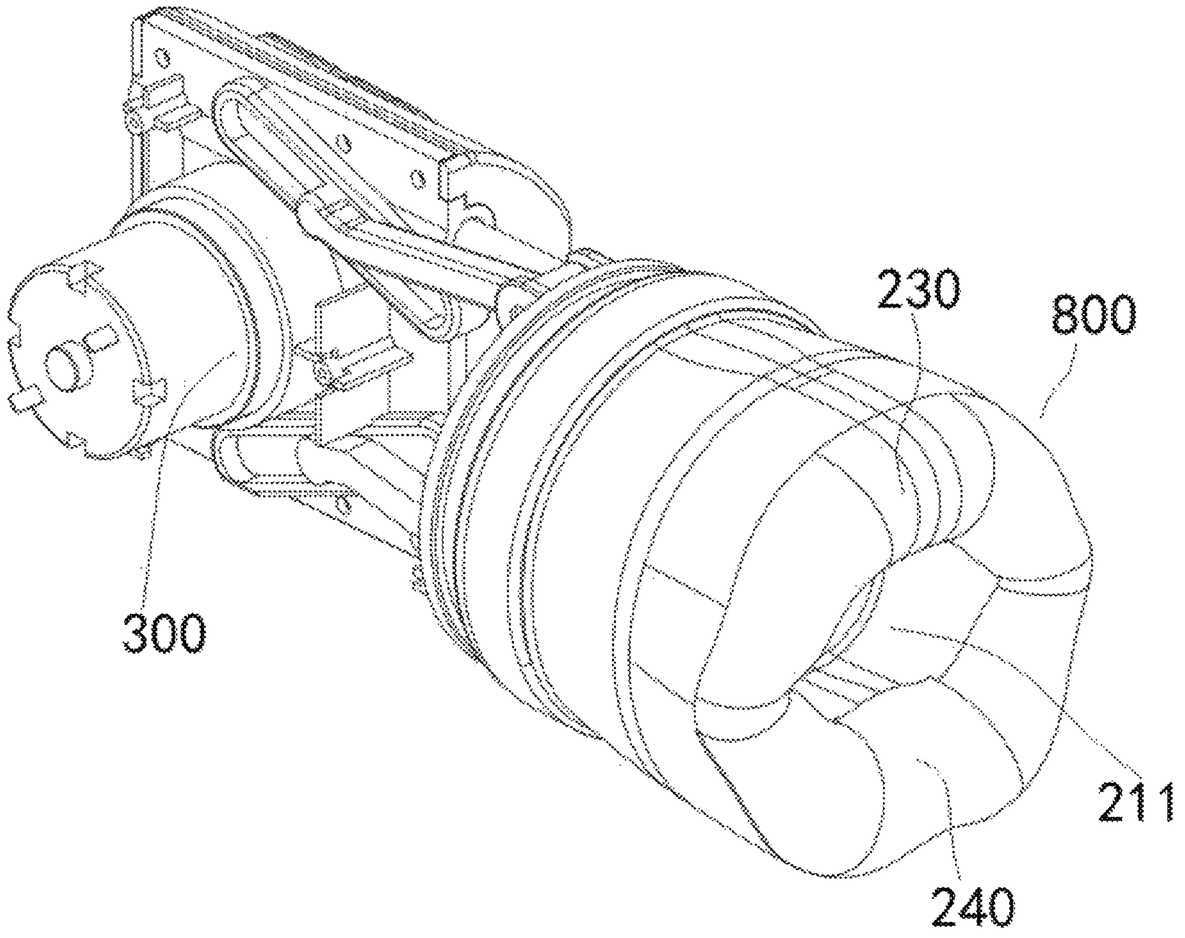
FIG. 12 is a partially schematic structural diagram of a massage device in another embodiment provided in an example of the present application.
Figure 13:
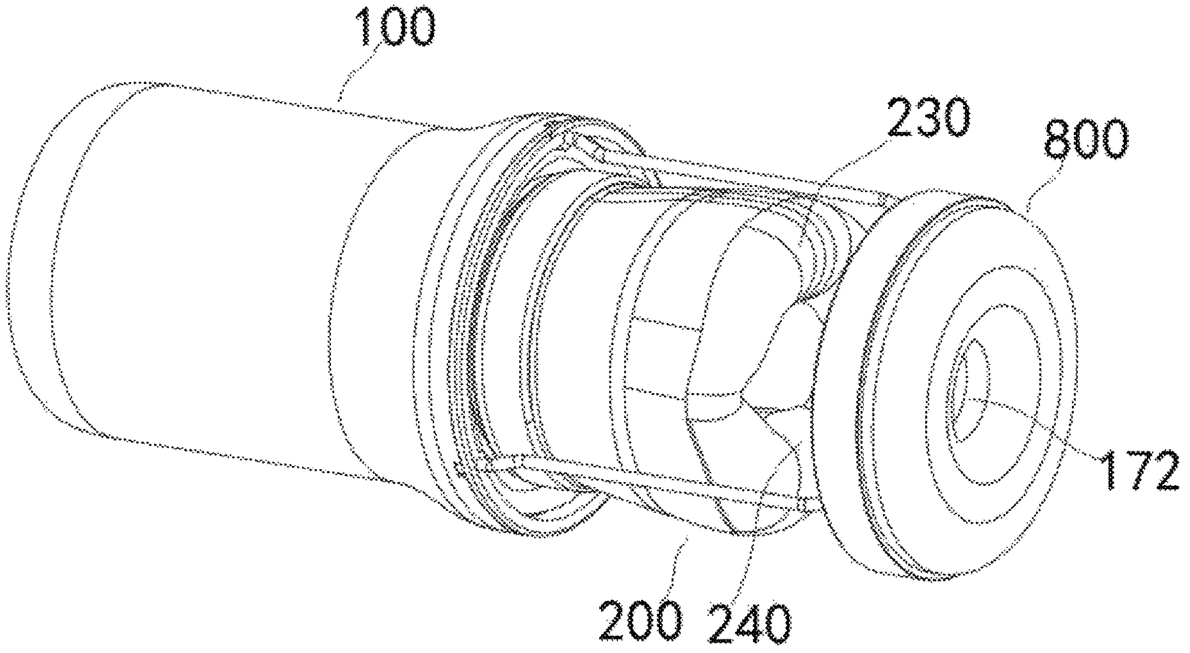
FIG. 13 is a perspective view of a massage device in another embodiment provided in an example of the present application.
Figure 14:
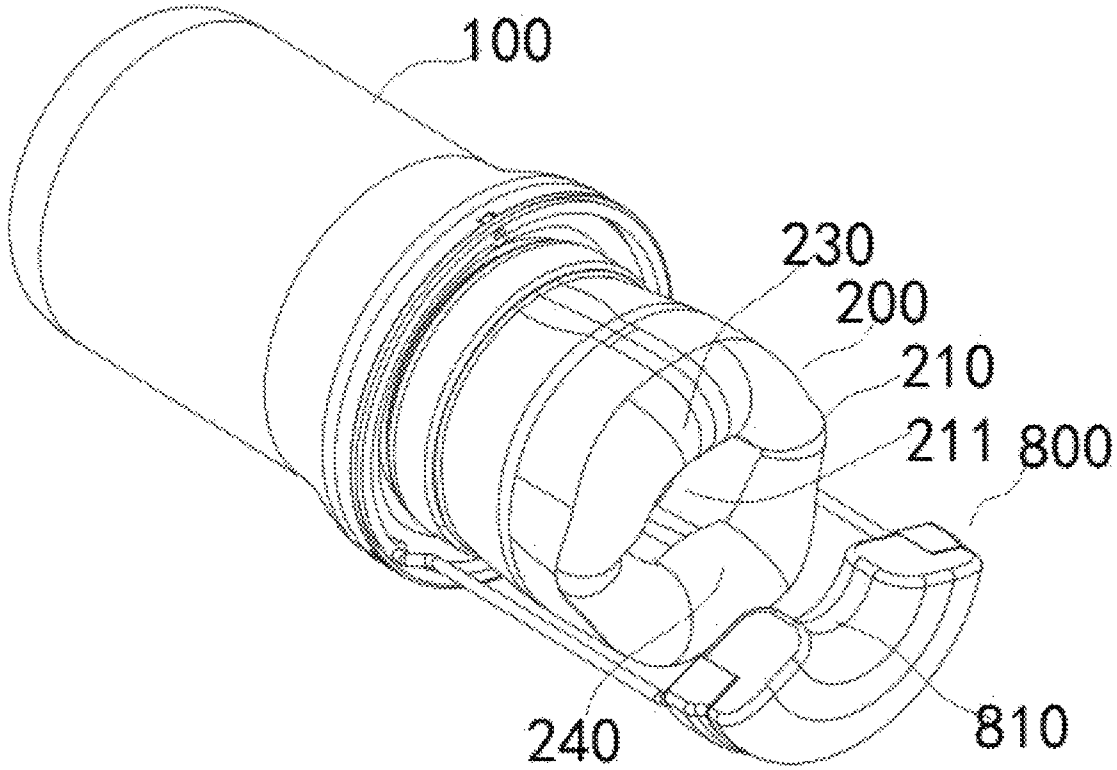
FIG. 14 is a schematic structural diagram of a massage device in another embodiment provided in an example of the present application.

In some examples, two sides of the first pinching portion 230 and two sides of the second pinching portion 240 are correspondingly connected to form a flexible sleeve 210, such that two opposite side walls of the flexible sleeve 210 serve as the first pinching portion 230 and the second pinching portion 240 respectively. As shown in FIGS. 12-14, an opening of the flexible sleeve 210 can be designed into a mouth shape, the first pinching portion 230 serves as an upper lip, and the second pinching portion 240 serves as a lower lip, such that the first pinching portion 230 and the second pinching portion 240 are engaged with each other to form a pinching massage effect in the massage cavity 211 of the massage portion 200.

Preferably, the at least one swing arm includes a first swing arm 410 and a second swing arm 420, a second end of the first swing arm 410 is slidably and rotationally connected to the housing 100, and a second end of the second swing arm 420 is slidably and rotationally connected to the housing 100. A middle portion of the first swing arm 410 and a middle portion of the second swing arm 420 are rotationally connected to two opposite sides of the massage part 200 respectively, the first end of the first swing arm 410 and the first end of the second swing arm 420 extend into the first pinching portion 230 and the second pinching portion 240 of the massage portion 200 respectively.

Thus, telescopic motion of the massage portion 200 and reciprocating swing of the first swing arm 410 and the second swing arm 420 are combined, such that the driving device enables the first end of the first swing arm 410 and the first end of the second swing arm 420 to swing in a reciprocating manner so as to approach or be away from each other while driving the massage portion 200 to perform telescopic massage, such that a pinching massage action can be generated between the first pinching portion 230 and the second pinching portion 240 on two opposite sides of the massage portion 200. Pinching massage between the first swing arm 410 and the second swing arm 420 is increased on the basis of telescopic massage of the massage portion 200, such two kinds of massage actions are performed synchronously, such that the massage effect is improved, massage actions and functions are diversified, and massage modes and massage actions of the massage device are diversified.

Figure 7:
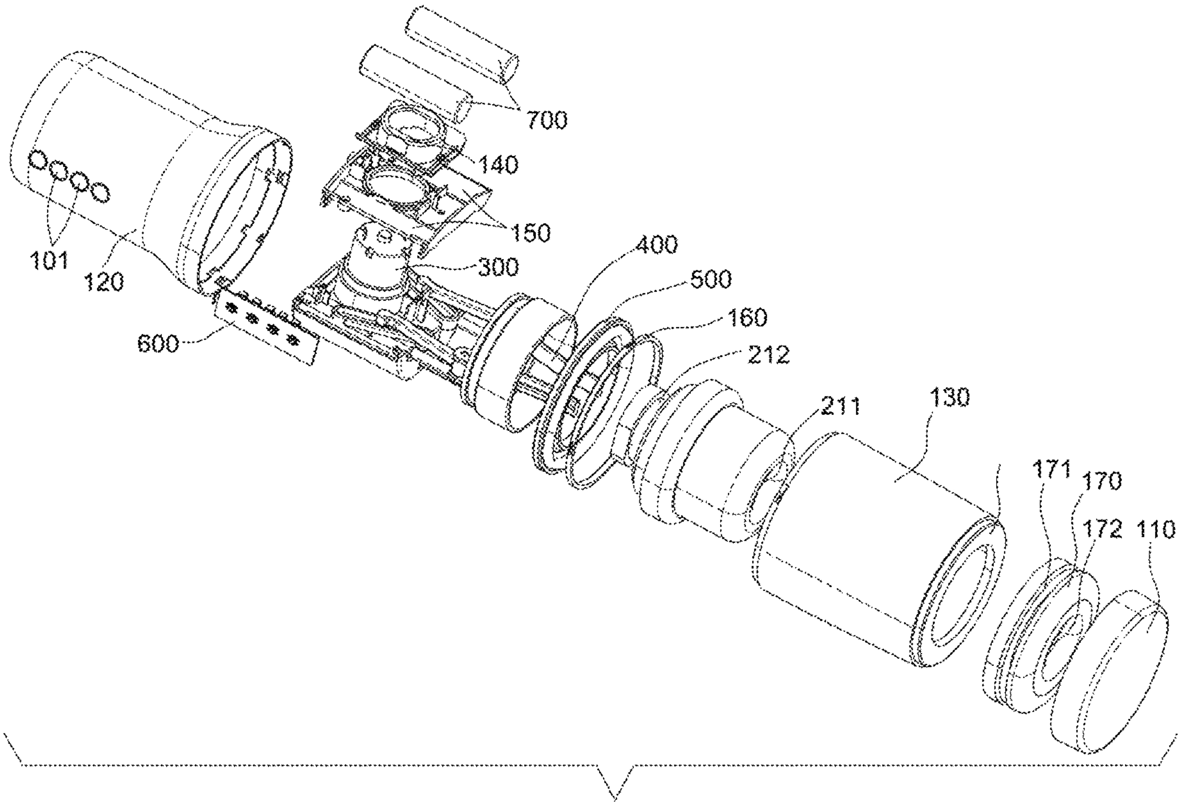
FIG. 7 is an exploded structural diagram of a massage device in an embodiment provided in an example of the present application.
Figure 8:
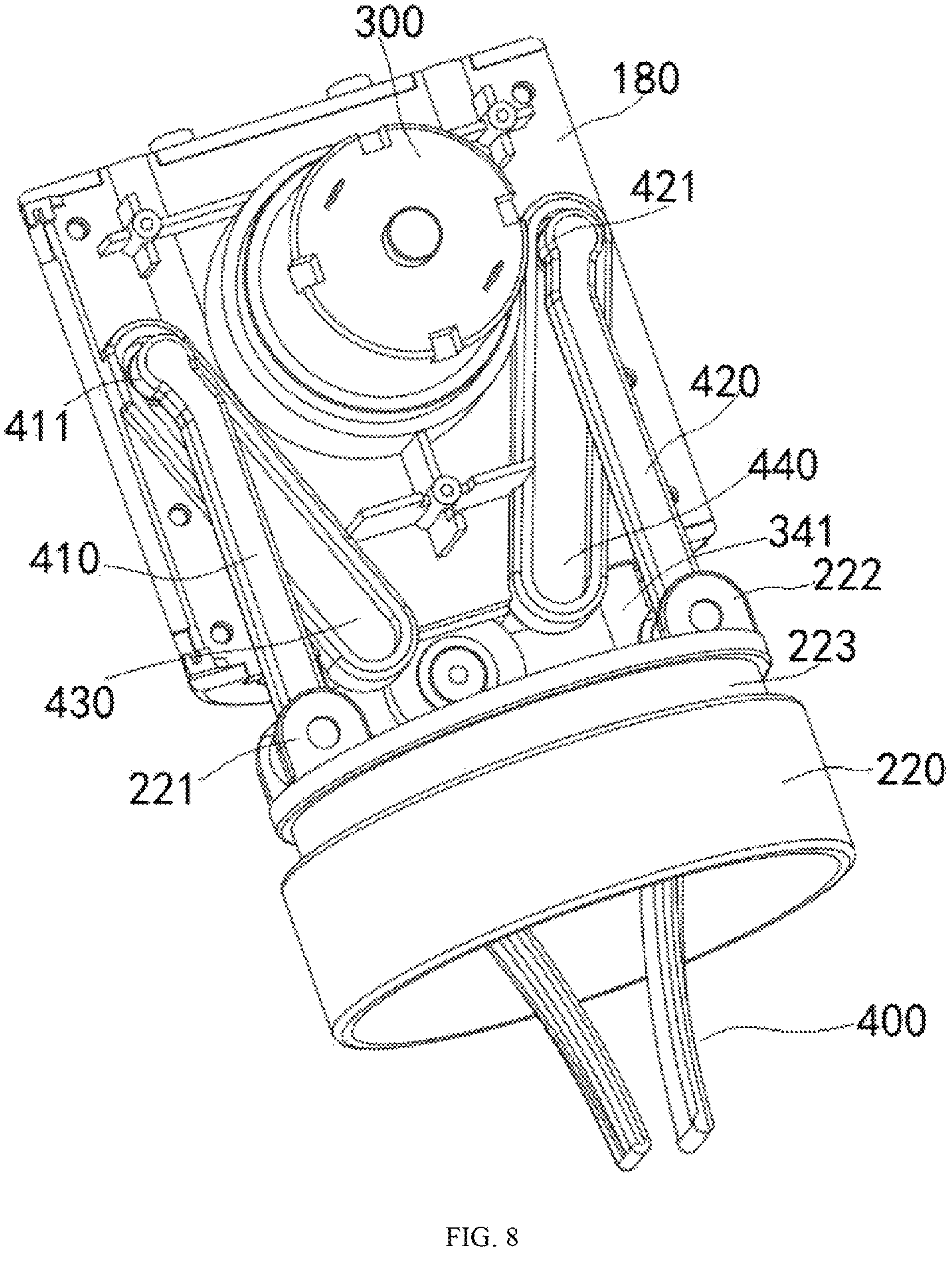
FIG. 8 is a partially schematic structural diagram of a massage device in an embodiment provided in an example of the present application.

Specifically, as shown in FIG. 7 and FIG. 8, the massage portion 200 includes a seat body 220 and a flexible sleeve 210, a first support 221 and a second support 222 are arranged on two opposite sides of the seat body 220 respectively, a middle portion of the first swing arm 410 is in pivoting connection to the first support 221, a middle portion of the second swing arm 420 is in pivoting connection to the second support 222, a rotation axis of the first swing arm 410 and a rotation axis of the second swing arm 420 are arranged perpendicular to a stretchable action direction of the massage portion 200, and the driving device is in driving connection to the seat body 220. The flexible sleeve 210 is mounted on the seat body 220, and an interior of the flexible sleeve 210 extends in a telescopic sliding motion direction of the flexible sleeve to form the massage cavity 211. The first end of the first swing arm 410 and the first end of the second swing arm 420 extend into the two opposite side walls of the massage cavity 211 respectively, such that when the driving device drives the massage portion 200 to perform telescopic massage, the two opposite sides of the massage cavity 211 can generate a pinching massage action. The seat body 220 is made of a plastic material, and the flexible sleeve 210 is made of a silicone or rubber material. In this way, the first end of the first swing arm 410 and the first end of the second swing arm 420 swing in a reciprocating manner and drive the two opposite side walls of the massage cavity 211 of the flexible sleeve 210 to protrude inwards respectively to form a pinching massage effect. In addition, a plurality of massage protrusions may be evenly arranged on an inner wall of the massage cavity 211 of the flexible sleeve 210 to enhance the telescopic massage effect.

Figure 6:
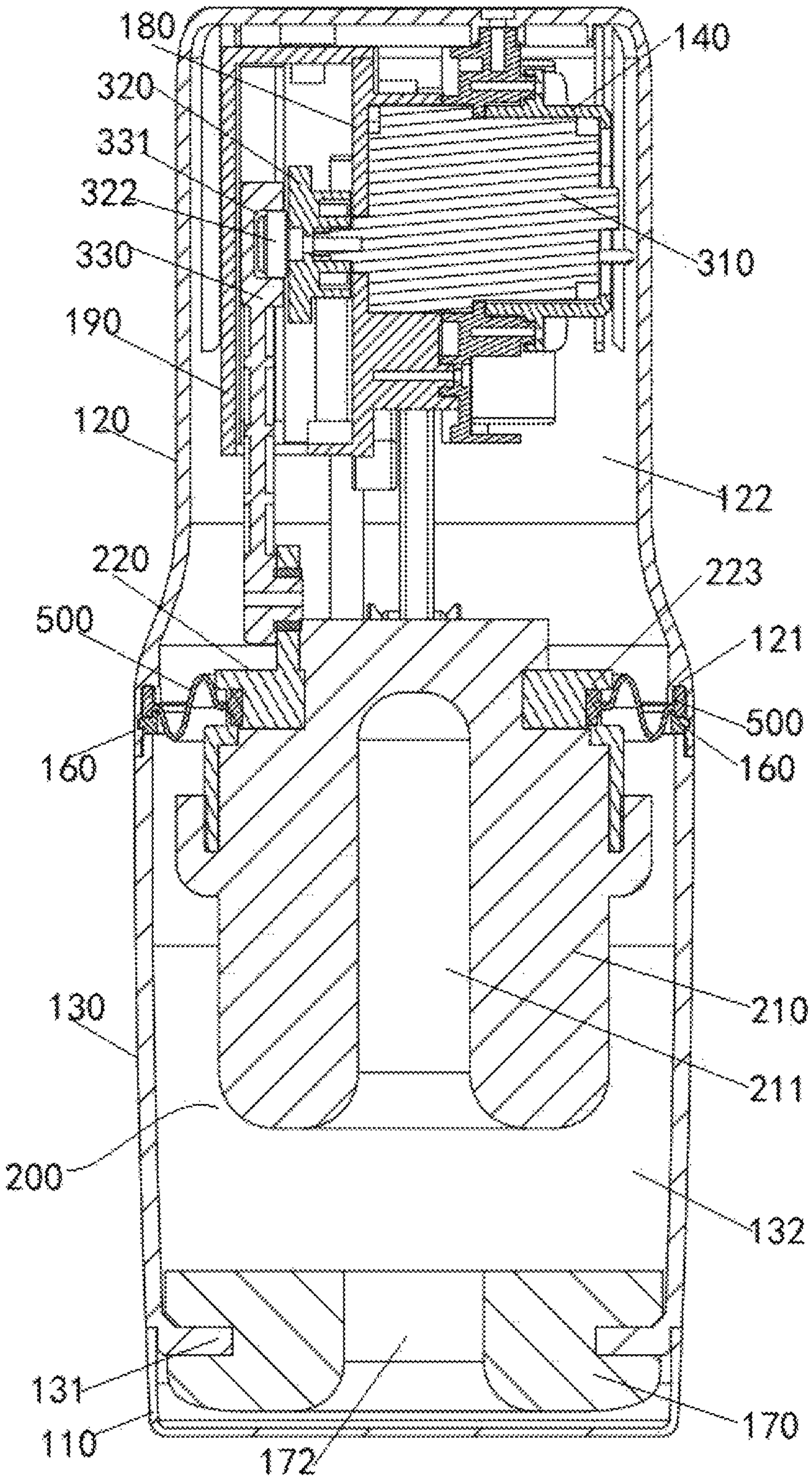
FIG. 6 is a cutaway diagram of section B-B in FIG. 5 provided in an example of the present application.
Figure 10:
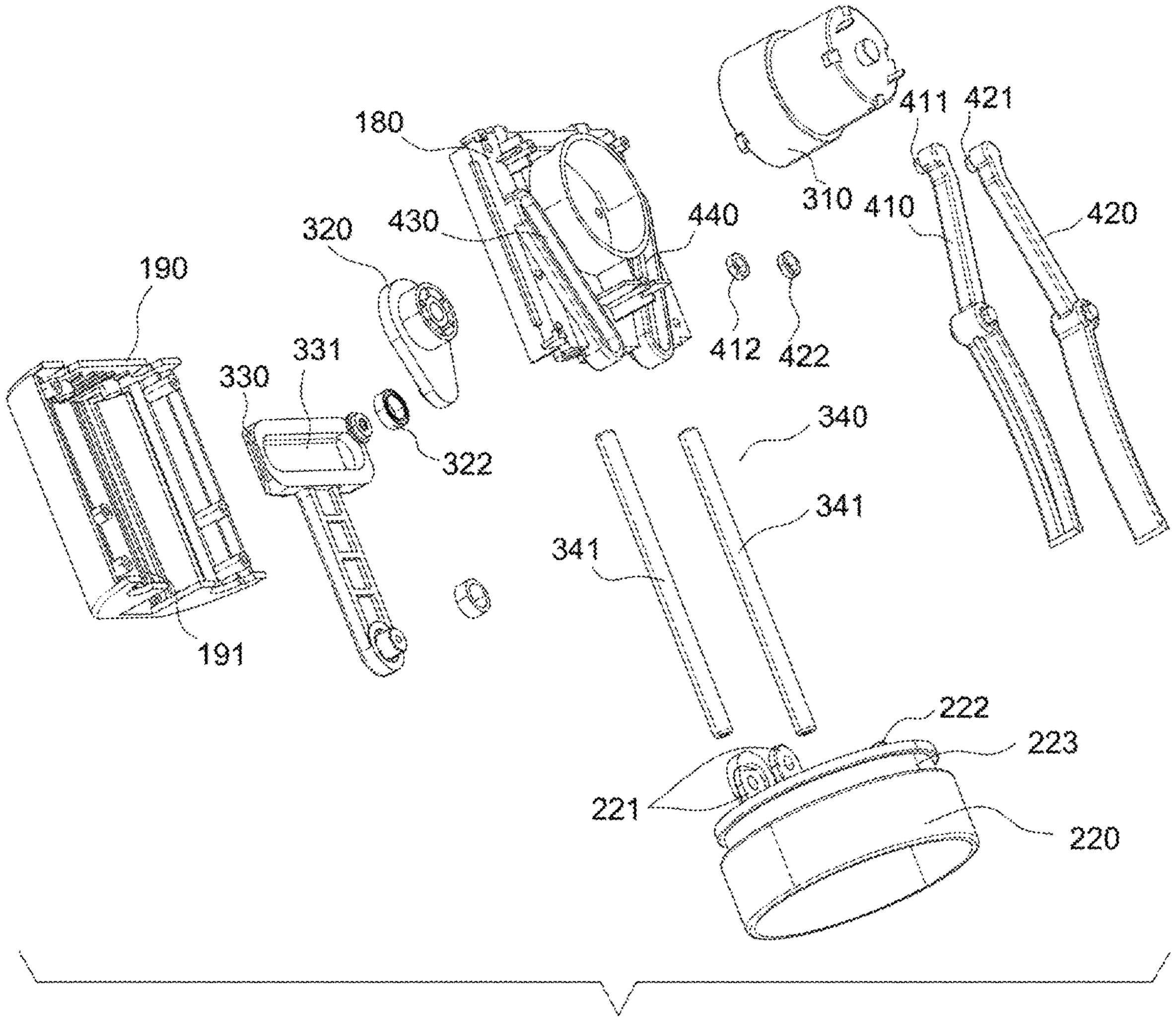
FIG. 10 is a partially exploded structural diagram of a massage device in an embodiment provided in an example of the present application.

As shown in FIG. 6 and FIG. 10, a first annular groove 212 is provided on a periphery of the flexible sleeve 210, such that the flexible sleeve 210 can be mounted by arranging the seat body 220 in the first annular groove 212 in a sleeved manner. The middle portion of the first swing arm 410 and the middle portion of the second swing arm 420 each are provided with a pivot shaft, such that the middle portion of the first swing arm 410 and the middle portion of the second swing arm 420 are in pivoting connection to the seat body 220 of the massage portion 200 through the pivot shafts respectively.

Figure 9:
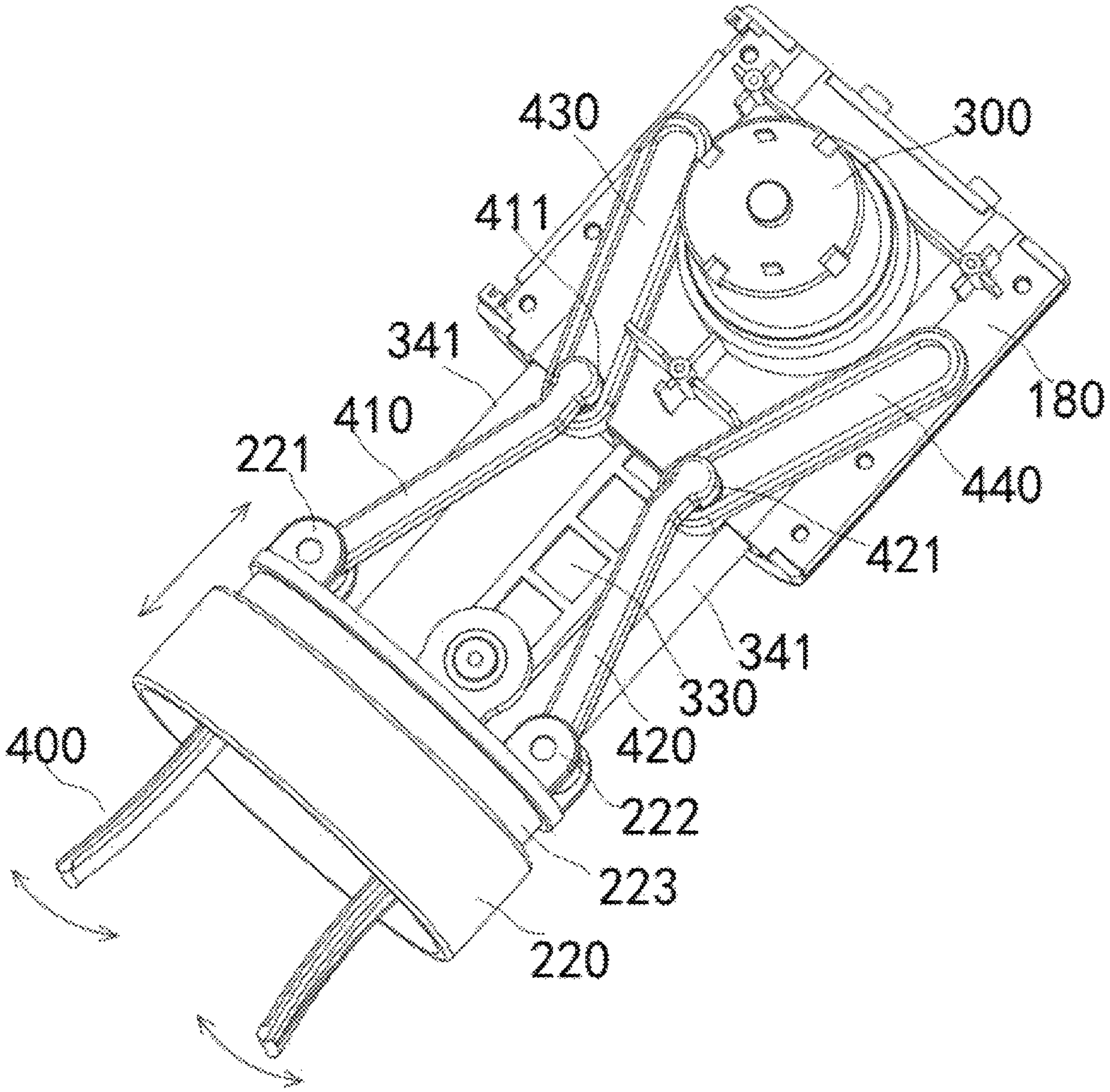
FIG. 9 is a schematic structural diagram in another state of a massage device in an embodiment provided in an example of the present application.

Further, as shown in FIG. 8 and FIG. 9, an inner wall of the housing 100 is provided with at least one guide groove, and the second end of the at least one swing arm is slidably and rotationally embedded in the at least one guide groove in a one-to-one corresponding manner.

Preferably, the at least one guide groove includes a first guide groove 430 and a second guide groove 440, and a first included angle is formed between an extending direction of the first guide groove 430 and an extending direction of the second guide groove 440. A first shaft end 411 extends from the second end of the first swing arm 410 in a direction parallel to the rotation axis of the first swing arm, and the first shaft end 411 is movably embedded in the first guide groove 430. A second shaft end 421 extends from the second end of the second swing arm 420 in a direction parallel to the rotation axis of the second swing arm, and the second shaft end 421 is movably embedded in the second guide groove 440, such that when the massage portion 200 is driven by the driving device to perform telescopic massage, the first shaft end 411 slides along the first guide groove 430 and the second shaft end 421 slides along the second guide groove 440, and the first end of the first swing arm 410 and the first end of the second swing arm 420 swing in a reciprocating manner around the rotation axes of the first swing arm and the second swing arm respectively in a manner of approaching or moving away from each other. Since the first swing arm 410 and the second swing arm 420 are rotationally connected to the seat body 220 of the massage portion 200, the first swing arm 410 and the second swing arm 420 move back and forth along with the massage portion 200 when the massage portion 200 performs telescopic motion. Then, under sliding fit between the first shaft end 411 and the first guide groove 430 and sliding fit between the second shaft end 421 and the second guide groove 440, the first end of the first swing arm 410 and the first end of the second swing arm 420 swing in a reciprocating manner around the rotation axes thereof in a manner of approaching or being away from each other, such that a pinching massage effect can be achieved between the first end of the first swing arm 410 and the first end of the second swing arm 420.

Figure 11:
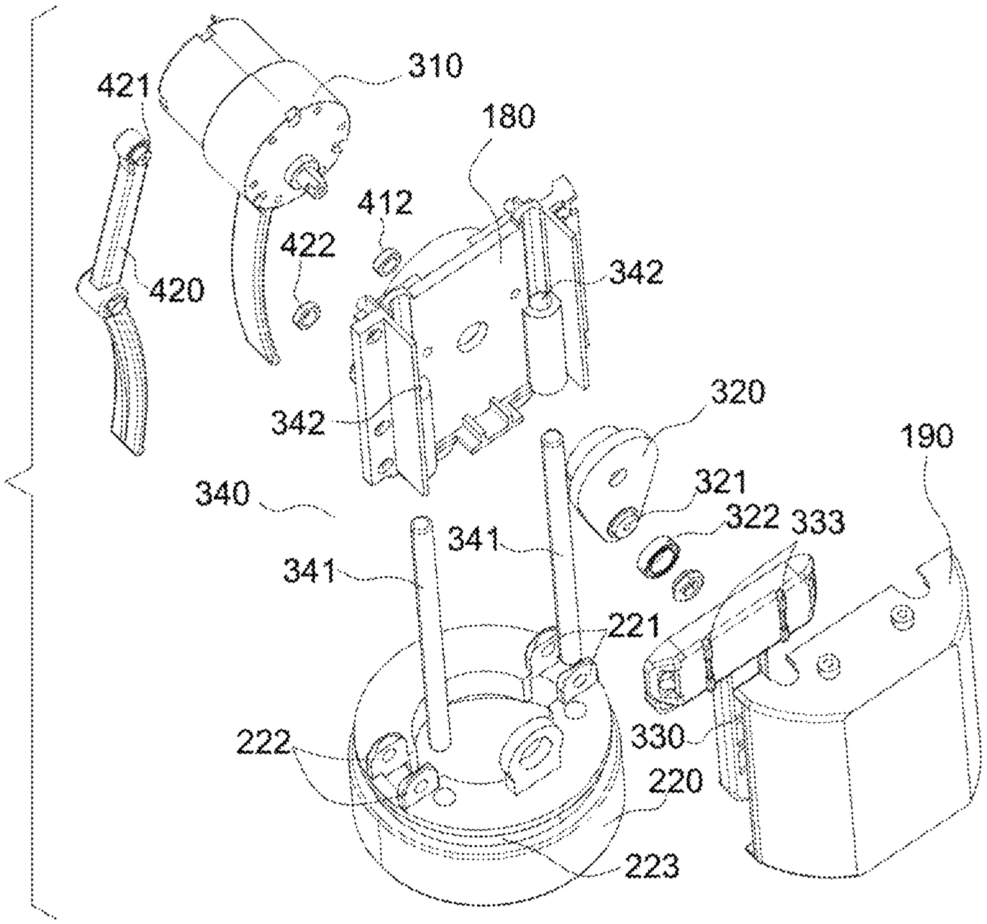
FIG. 11 is a partially exploded structural diagram from another view of a massage device in an embodiment provided in an example of the present application.

Preferably, as shown in FIG. 10 and FIG. 11, the first shaft end 411 is movably embedded in the first guide groove 430 through a first bearing 412, and the second shaft end 421 is movably embedded in the second guide groove 440 through a second bearing 422. By using the bearings, reciprocating swing of the first swing arm 410 under guidance of the first guide groove 430 is smoother, and reciprocating swing of the second swing arm 420 under guidance of the second guide groove 440 is smoother, so as to improve stability and reliability of the structure, and the massage effect is better.

Specifically, as shown in FIGS. 8-11, a second included angle is formed between the extending direction of the first guide groove 430 and the telescopic motion direction of the massage portion 200, a third included angle is formed between the extending direction of the second guide groove 440 and the telescopic motion direction of the massage portion 200, the first included angle is equal to the sum of the second included angle and the third included angle, and the first included angle is set to be greater than 0° and less than 90°. A combination of the first guide groove 430 and the second guide groove 440 is set to be in a splayed shape, the first swing arm 410 is divided into two rod members at the pivot shaft, a fourth included angle is formed between extension directions of the two rod members, and the fourth included angle is set as an obtuse angle. The second swing arm 420 has the same structure as the first swing arm 410, and will not be repeated herein. Thus, when the first shaft end 411 of the first swing arm 410 moves forward and backward along the first guide groove 430 and the second shaft end 421 of the second swing arm 420 moves forward and backward along the second guide groove 440, along with the change of a stroke, the first swing arm 410 and the second swing arm 420 are urged to rotate and swing forward and backward within a certain angle range respectively by taking pivot axes thereof as fulcrums, so as to achieve the purpose of a gradually unfolded and folded pinching massage action between the first end of the first swing arm 410 and the first end of the second swing arm 420.

Figure 4:
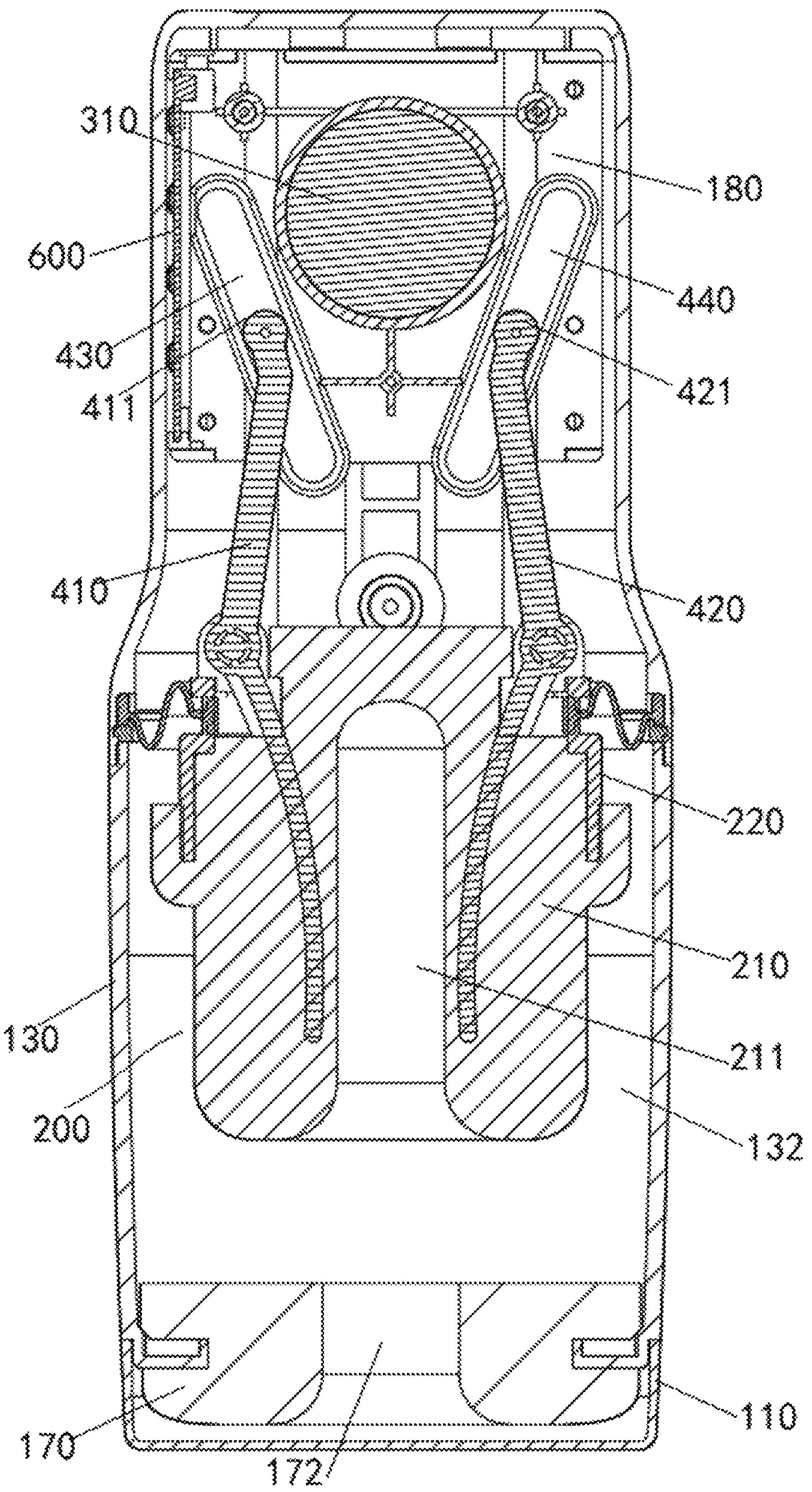
FIG. 4 is a cutaway diagram of section A-A in FIG. 3 provided in an example of the present application.
Figure 5:
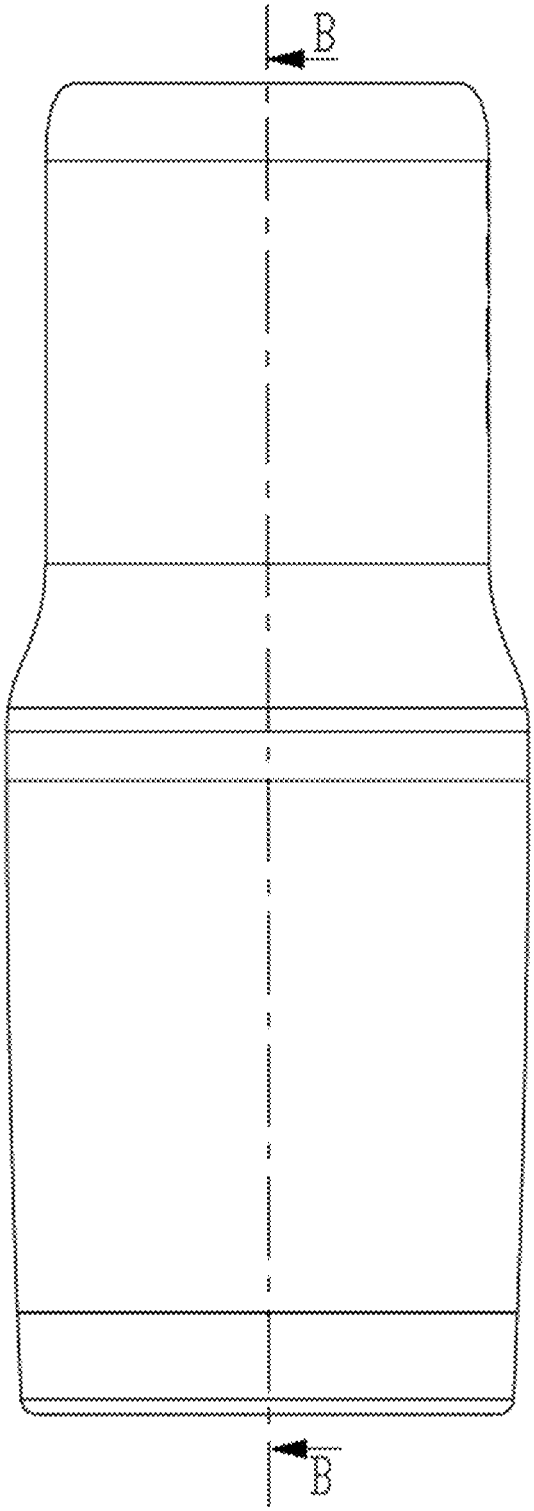
FIG. 5 is a side view of a massage device in an embodiment provided in an example of the present application.

In this example, as shown in FIG. 4 and FIG. 6, a hollow cavity is formed in the housing 100, and the massage portion 200 is arranged in a stretchable manner in a longitudinal axis direction of the hollow cavity. A flexible waterproof ring 500 is arranged between an outer periphery of the massage portion 200 and an inner wall of the hollow cavity to divide the hollow cavity into a closed cavity 122 and an open cavity 132 through the flexible waterproof ring 500, the flexible waterproof ring 500 is arranged in a stretchable manner in a telescopic motion direction of the massage portion 200, and the driving device is arranged in the closed cavity 122. An end, facing the closed cavity 122, of the massage cavity 211 of the flexible sleeve 210 is a closed end, and an end, facing away from the closed cavity 122, of the massage cavity 211 of the flexible sleeve 210 is an open end. A circuit board 600 for controlling operation of the massage device and a power supply 700 for supplying power are arranged in the closed cavity 122, a control button 101 is arranged on an outer side wall of the closed cavity 122, and a switch is arranged on the circuit board 600. In addition, the switch is arranged corresponding to the control button 101, a rechargeable lithium battery preferably serves as the power supply 700, and a mounting bracket 150 for mounting the power supply 700 is arranged in the closed cavity 122. In this way, electronic components are mounted in the closed cavity 122 and sealed by the flexible waterproof ring 500 to achieve a waterproof effect.

Preferably, as shown in FIG. 6, the seat body 220 is circumferentially provided with an annular groove 223, an inner ring of the flexible waterproof ring 500 is arranged in the annular groove 223 in a sleeved manner, an outer ring of the flexible waterproof ring 500 is fixed to the inner wall of the hollow cavity through a pressing ring 160, and the flexible waterproof ring 500 is made of a silicone or rubber material. The inner wall of the hollow cavity of the housing 100 is circumferentially provided with a flange 121, fixing is achieved by arranging the outer ring of the flexible waterproof ring 500 between the flange 121 and the pressing ring 160, and the pressing ring 160 is detachably connected to the inner wall of the housing 100 through snap connection.

Specifically, as shown in FIGS. 1-6, the housing 100 includes an upper housing 120, a lower housing 130, an end cover 110 and a bracket 180, where the upper housing 120 and the lower housing 130 are detachably connected through a buckle, an opening of the open cavity 132 is detachably covered with the end cover 110, the bracket 180 is arranged in the closed cavity 122, and the driving device is mounted in the closed cavity 122 through the bracket 180. The first guide groove 430 and the second guide groove 440 are both provided on the bracket 180.

In some examples, the massage device further includes a positioning portion 800, where the positioning portion 800 is used for supporting a massage region of body, and the positioning portion 800 is arranged at a front end of the housing 100. In this way, the massage region of body is supported by the positioning portion 800 and extends into the massage cavity 211 of the massage portion 200 for telescopic massage and pinching massage, such that the user feels relaxed and free in a massage process, and use of the massage device is enabled to be convenient.

Figure 2:
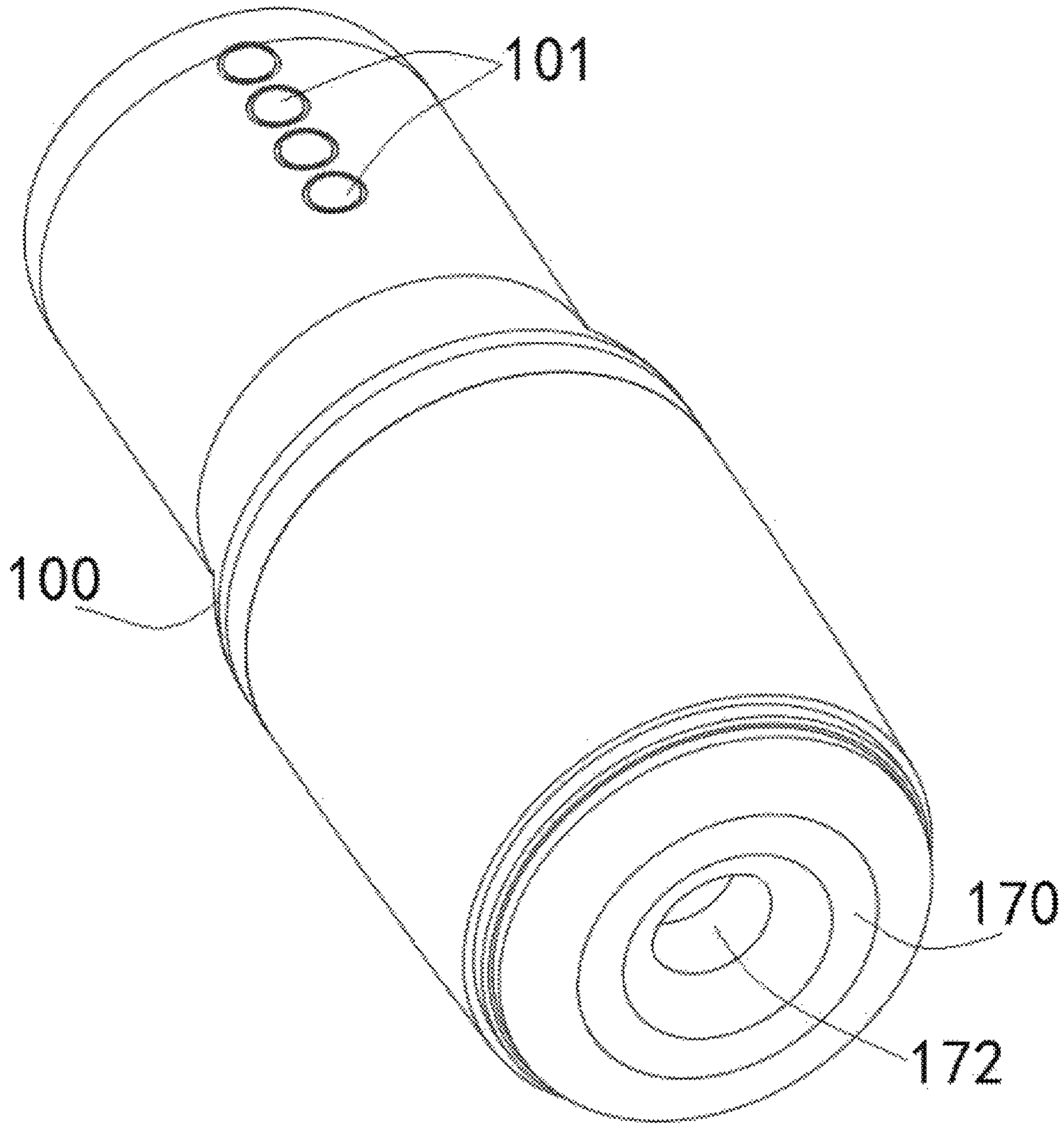
FIG. 2 is a perspective view of a massage device with an end cover dismounted in an embodiment provided in an example of the present application.
Figure 3:
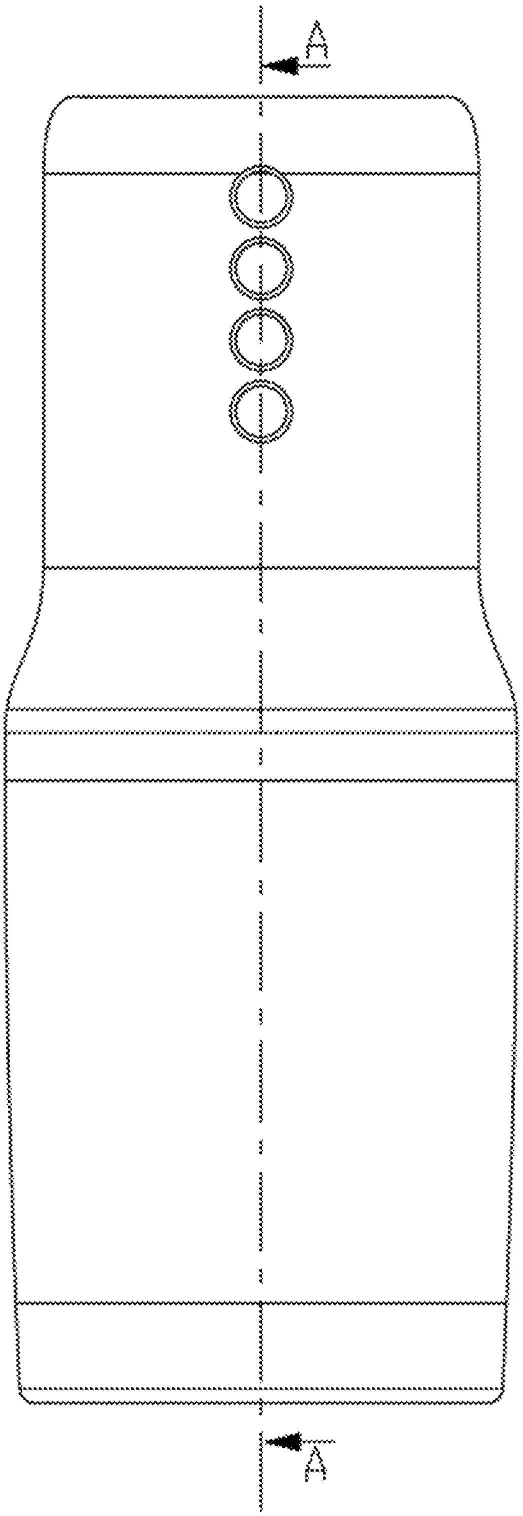
FIG. 3 is a front view of a massage device in an embodiment provided in an example of the present application.

Optionally, as shown in FIG. 2, FIG. 7 and FIG. 13, a secondary flexible sleeve 170 is provided at the opening of the open cavity 132, such that the secondary flexible sleeve 170 in an annular sleeve structure is used as the positioning portion 800. The secondary flexible sleeve 170 is provided with an insertion opening 172 in a through manner in the telescopic motion direction of the massage portion 200, and the insertion opening 172 is provided corresponding to the massage cavity 211, such that the massage region of body extends into the massage cavity 211 of the massage portion 200 through the insertion opening 172 for telescopic massage and pinching massage. The secondary flexible sleeve 170 is made of a silicone or rubber material, and the secondary flexible sleeve 170 is provided with a second annular groove 171 in a circumferential direction, and the opening of the open cavity 132 extends inwards to form a convex ring 131, such that the secondary flexible sleeve 170 is mounted by embedding the convex ring 131 in the second annular groove 171.

In other examples, as shown in FIG. 14, the positioning portion 800 may be arranged outside the housing 100 through a supporting rod, the positioning portion 800 is at least partially made of a silicone or rubber material, and an arc-shaped supporting surface 810 for supporting the massage region of body is arranged on the positioning portion 800, such that the massage region of body is placed on the arc-shaped supporting surface 810 of the positioning portion 800 for being supported and positioned, and the massage region of body is prevented from being separated from the massage cavity 211 of the massage portion 200 in the massage process, which is convenient for the user during massage.

In this example, as shown in FIGS. 8-11, the driving device includes a telescopic driving mechanism 300, and the telescopic driving mechanism 300 is in driving connection to the seat body 220, such that the telescopic driving mechanism 300 drives the massage portion 200 to move back and forth through the seat body 220.

Specifically, the telescopic driving mechanism 300 includes a driving motor 310, a rotating member 320, a push-pull member 330 and a guide structure 340, where the driving motor 310 is arranged in the housing 100, the rotating member 320 is in driving connection to an output shaft of the driving motor 310, one end of the push-pull member 330 is movably connected to the rotating member 320, and the other end of the push-pull member 330 is connected to the massage portion 200, such that the rotating member 320 is driven to rotate through the driving motor 310, and the massage portion 200 is driven to perform telescopic motion through the push-pull member 330. The guide structure 340 is arranged between the massage portion 200 and the housing 100, such that the massage portion 200 is guided through the guide structure 340 to do a telescopic massage action along a predetermined path.

Specifically, as shown in FIG. 10 and FIG. 11, a rotation axis of the rotating member 320 extends in a direction perpendicular to the telescopic motion direction of the massage portion 200, and the rotating member 320 extends in a direction parallel to the rotation axis thereof to be provided with a third shaft end 321. One end of the push-pull member 330 is provided with a sliding groove 331 in a direction perpendicular to the telescopic motion direction of the massage portion 200, and the third shaft end 321 is movably embedded in the sliding groove 331 through a third bearing 322. The rotating member 320 is in a cam structure, the third shaft end 321 is arranged at an eccentric position of the rotating member 320, the other end of the push-pull member 330 is provided with a fourth shaft end 332 in a direction parallel to an axial direction of the third shaft end 321, and the other end of the push-pull member 330 is connected with to the massage portion 200 through the fourth shaft end 332. Thus, when the driving motor 310 drives the rotating member 320 to rotate, sliding fit between the third shaft end 321 and the sliding groove 331 enables the push-pull member 330 to push and pull the massage portion 200 to reciprocate in a guide direction of the guide structure 340, thereby generating a telescopic massage effect.

The driving motor 310 is mounted in the housing 100 through an electric motor seat 140, one end of the rotating member 320 and one end of the push-pull member 330 are both located in a mounting space formed by the bracket 180 and a cover body 190 in an enclosed manner, and the bracket 180 and the cover body 190 are detachably buckled and connected through a screw column. The push-pull member 330 is approximately in a T-shaped structure, a guiding structure is arranged between the push-pull member 330 and an inner wall of the cover body 190, and the push-pull member 330 is guided to reciprocate in the telescopic motion direction of the massage portion 200 by the guiding structure. Specifically, ribs 333 are arranged on a side surface of the push-pull member 330 in the telescopic motion direction of the massage portion 200, strip-shaped grooves 191 are correspondingly provided on an inner wall of the cover body 190, and the ribs 333 are slidably embedded in the strip-shaped grooves 191.

Further, the guide structure 340 includes a guide post 341 and a guide sleeve 342, where one end of the guide post 341 is arranged on the seat body 220 of the massage portion 200, and the guide post 341 extends in an axial direction of the hollow cavity of the housing 100. The guide sleeve 342 is arranged on the bracket 180 of the housing 100, and the guide sleeve 342 is slidably arranged on the guide post 341 in a sleeving manner. Thus, the massage portion 200 is guided to reciprocate in the axial direction of the hollow cavity of the housing 100 through sliding fit between the guide sleeve 342 and the guide post 341 to generate a telescopic massage action.

From the above description, it can be seen that the above-mentioned embodiments of the present disclosure achieve the following technical effects:

for the massage device in this example, telescopic sliding of the massage portion 200 and reciprocating swing of the swing arms are combined, such that at least one of the first pinching portion 230 and the second pinching portion 240 is driven to move in the direction approaching or being away from each other through while the first pinching portion 230 and the second pinching portion 240 move back and forth, thereby increasing pinching massage between the first pinching portion 230 and the second pinching portion 240 on the basis of telescopic massage of the massage portion 200, diversifying massage actions or functions of the massage device, obviously improving a massage effect, and bringing good massage experience to users.

It should be understood that when an element is referred to as being "on" or "connected to" another element, it can be directly on the other element or directly connected to the other element or indirectly connected to the other element by an intervening element therebetween. On the contrary, when an element is referred to as being "directly on" or "directly connected to" another element, there are no intervening elements therebetween. Also, it should be noted that if directional indications (such as up, down, left, right, front, back, etc.) are involved in the embodiment of the present disclosure, the directional indications are only used to explain a relative position relationship, a movement condition and the like between various components under a certain posture (as shown in the accompanying drawings). If the specific posture changes, the directional indication changes accordingly.

The above are the preferred embodiments of the present disclosure. It should be noted that those skilled in the art can make several improvements and modifications without departing from the principles of the present disclosure, and these improvements and modifications may be regarded as the protection scope of the present disclosure.

What is claimed is:

1. A massage device, comprising:

a housing;

a massage portion, wherein the massage portion is slidably arranged on the housing, and the massage portion comprises a first pinching portion and a second pinching portion that are oppositely arranged and made of flexible materials, such that a massage cavity is provided between the first pinching portion and the second pinching portion;

a positioning portion used for supporting a massage region of body and arranged at a front end of the housing;

at least one swing arm, wherein a first end of the at least one swing arm is arranged in at least one of the first pinching portion and the second pinching portion; and a driving device, wherein the driving device is used for driving the first pinching portion and the second pinching portion to move back and forth in a direction facing the positioning portion, and simultaneously driving at least one of the first pinching portion and the second pinching portion to move in a direction approaching or being away from each other through the at least one swing arm;

wherein the at least one swing arm is rotationally mounted on the massage portion, and a second end of the at least one swing arm is slidably and rotationally connected to the housing.

2. The massage device according to claim 1, wherein two sides of the first pinching portion and two sides of the second pinching portion are correspondingly connected to form a flexible sleeve, an interior of the flexible sleeve extends in a sliding direction of the flexible sleeve to form the massage cavity, and an end, facing the positioning portion, of the massage cavity is provided with an opening.

3. The massage device according to claim 2, wherein the massage portion further comprises a seat body, the flexible sleeve is mounted on the seat body, and the seat body is slidably connected to the housing.

4. The massage device according to claim 3, wherein the driving device comprises a telescopic driving mechanism, and the telescopic driving mechanism is in driving connection to the seat body, such that the telescopic driving mechanism drives the massage portion to move back and forth through the seat body.

5. The massage device according to claim 3, wherein a hollow cavity is provided in the housing, the massage portion is slidably and at least partially arranged in the hollow cavity, a flexible waterproof ring is arranged between an outer periphery of the seat body and an inner wall of the hollow cavity, the flexible waterproof ring is arranged in a stretchable manner in a sliding direction of the massage portion, an annular groove is circumferentially provided in the seat body, an inner ring of the flexible waterproof ring is arranged in the annular groove in a sleeved manner, and an outer ring of the flexible waterproof ring is fixed on the inner wall of the hollow cavity through a pressing ring.

6. The massage device according to claim 1, wherein the housing is provided with at least one guide groove, and the second end of the at least one swing arm is slidably and rotationally embedded in the at least one guide groove in a one-to-one corresponding manner.

7. The massage device according to claim 6, wherein the at least one guide groove comprises a first guide groove and a second guide groove, a first included angle is formed between an extending direction of the first guide groove and an extending direction of the second guide groove, the at least one swing arm comprises a first swing arm and a second swing arm, a second end of the first swing arm is slidably and rotationally embedded in the first guide groove, and a second end of the second swing arm is slidably and rotationally embedded in the second guide groove, such that when the second end of the first swing arm slides along the first guide groove and the second end of the second swing arm slides along the second guide groove, a first end of the first swing arm and a first end of the second swing arm swing back and forth in a direction approaching or being away from each other.

8. The massage device according to claim 7, wherein a first shaft end extends from the second end of the first swing arm in a direction parallel to an rotation axis of the first swing arm, the first shaft end is rotationally and slidably embedded in the first guide groove, a second shaft end extends from the second end of the second swing arm in a direction parallel to a rotation axis of the second swing arm, and the second shaft end is rotationally and slidably embedded in the second guide groove.

9. The massage device according to claim 1, wherein the driving device comprises a telescopic driving mechanism, and the telescopic driving mechanism comprises:

a driving motor arranged in the housing;

a rotating member being in driving connection to the driving motor;

a push-pull member, wherein one end of the push-pull member is movably connected to the rotating member, and the other end of the push-pull member is connected to the massage portion, such that the rotating member is driven to rotate through the driving motor, and the massage portion is driven to move back and forth through the push-pull member; and a guide structure, wherein the guide structure is arranged between the massage portion and the housing, such that the massage portion is guided to move back and forth along a predetermined path through the guide structure.

10. The massage device according to claim 9, wherein a rotation axis of the rotating member extends in a direction perpendicular to a sliding direction of the massage portion, a third shaft end extends in a direction parallel to the rotation axis of the rotating member at an eccentric position of the rotating member, a sliding groove is provided at one end of the push-pull member in a direction perpendicular to the sliding direction of the massage portion, and the third shaft end is movably embedded in the sliding groove.

11. The massage device according to claim 1, wherein a hollow cavity is provided in the housing, the massage portion is slidably and at least partially arranged in the hollow cavity, a flexible waterproof ring is arranged between an outer periphery of the massage portion and an inner wall of the hollow cavity, and the flexible waterproof ring is arranged in a stretchable manner in a sliding direction of the massage portion.

12. The massage device according to claim 1, wherein the positioning portion is in an annular sleeve structure, such that an insertion opening is provided on the positioning portion, and the insertion opening is arranged corresponding to the massage cavity; or the positioning portion is provided with an arc-shaped supporting surface for supporting the massage region of body.

13. The massage device according to claim 12, wherein the positioning portion is at least partially made of a silicone or rubber material.

14. A massage device, comprising:

a housing;

a massage portion, wherein the massage portion is slidably arranged on the housing, and the massage portion comprises a first pinching portion and a second pinching portion that are oppositely arranged and made of flexible materials, such that a massage cavity is provided between the first pinching portion and the second pinching portion;

at least one swing arm, wherein a first end of the at least one swing arm is arranged in at least one of the first pinching portion and the second pinching portion;

a driving device, wherein the driving device is used for driving the first pinching portion and the second pinching portion to move back and forth, and simultaneously driving at least one of the first pinching portion and the second pinching portion to move in a direction approaching or being away from each other through the at least one swing arm; and the at least one swing arm is rotationally mounted on the massage portion, and a second end of the at least one swing arm is slidably and rotationally connected to the housing.

15. The massage device according to claim 14, wherein two sides of the first pinching portion and two sides of the second pinching portion are correspondingly connected to form a flexible sleeve, an interior of the flexible sleeve extends in a sliding direction of the flexible sleeve to form the massage cavity, and one end of the massage cavity is provided with an opening.

16. The massage device according to claim 15, wherein the massage portion further comprises a seat body, the flexible sleeve is mounted on the seat body, and the seat body is slidably connected to the housing.

17. The massage device according to claim 14, wherein the housing is provided with at least one guide groove, and the second end of the at least one swing arm is slidably and rotationally embedded in the at least one guide groove in a one-to-one corresponding manner.

18. A massage device, comprising:

a housing;

a massage portion, wherein the massage portion is slidably arranged on the housing, and the massage portion comprises a first pinching portion and a second pinching portion that are oppositely arranged and made of flexible materials, such that a massage cavity is provided between the first pinching portion and the second pinching portion;

at least one swing arm, wherein a first end of the at least one swing arm is arranged in at least one of the first pinching portion and the second pinching portion; and a driving device, wherein the driving device is used for driving the first pinching portion and the second pinching portion to move back and forth, and simultaneously driving at least one of the first pinching portion and the second pinching portion to move in a direction approaching or being away from each other through the at least one swing arm;

wherein the at least one swing arm is rotationally mounted on the massage portion, and a second end of the at least one swing arm is slidably and rotationally connected to the housing.

19. The massage device according to claim 18, wherein the at least one swing arm is rotationally mounted on the massage portion, the housing is provided with at least one guide groove, and a second end of the at least one swing arm is slidably and rotationally embedded in the at least one guide groove in a one-to-one corresponding manner.

* * * * *